May 6, 1941.  W. M. THOMPSON  2,240,586
MOTOR VEHICLE
Filed June 15, 1939  2 Sheets-Sheet 1

INVENTOR.
William M. Thompson
BY J. L. Chisholm
ATTORNEY.

May 6, 1941.  W. M. THOMPSON  2,240,586
MOTOR VEHICLE
Filed June 15, 1939  2 Sheets-Sheet 2

INVENTOR.
William M. Thompson
BY J. L. Chisholm
ATTORNEY.

Patented May 6, 1941

2,240,586

UNITED STATES PATENT OFFICE 2,240,586

MOTOR VEHICLE

William M. Thompson, Meadville, Pa.

Application June 15, 1939, Serial No. 279,302

5 Claims. (Cl. 296—44)

This invention relates to motor vehicles and particularly to devices for facilitating parking in congested city streets.

It is among the objects of the invention to provide a motor vehicle which can be rapidly, safely and easily parked, even by inexpert operators, without danger of striking a curb, which may damage tires or fenders or cause congestion by blocking traffic.

Other objects will be apparent in the annexed description and in the drawings showing one form of my invention.

Figure 1:
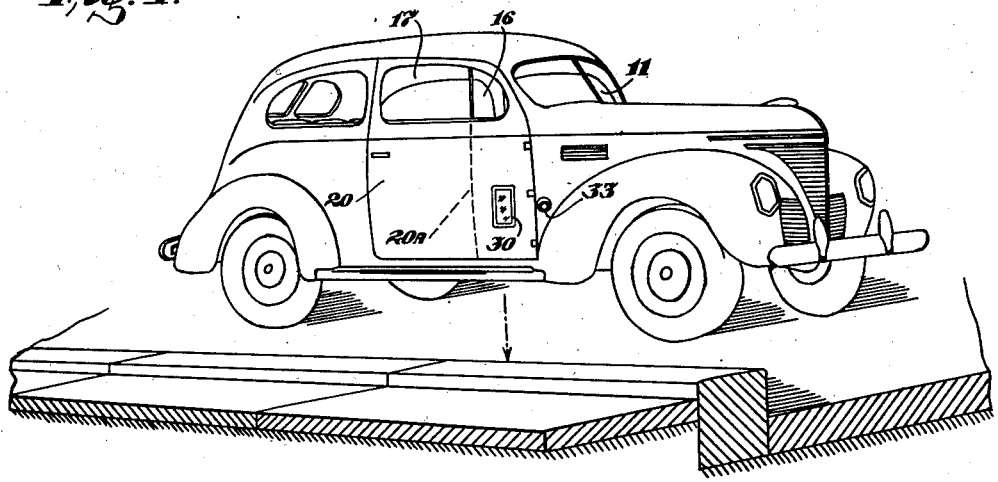
Fig. 1 is a perspective view of a motor vehicle embodying my invention and includes a fragmentary section in perspective of a city street and curb.
Figure 2:
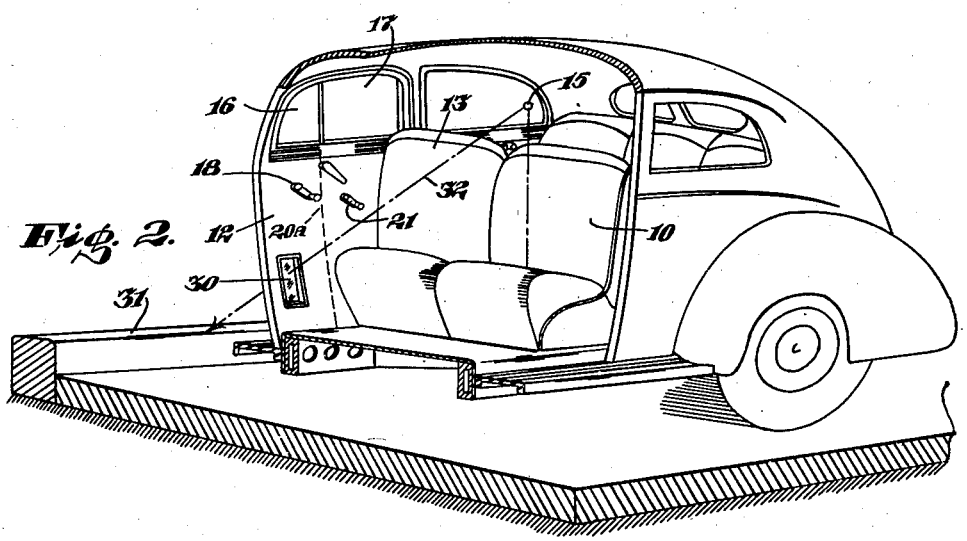
Fig. 2 is a perspective view of the rear portion of a car equipped with my invention.
Figure 3:
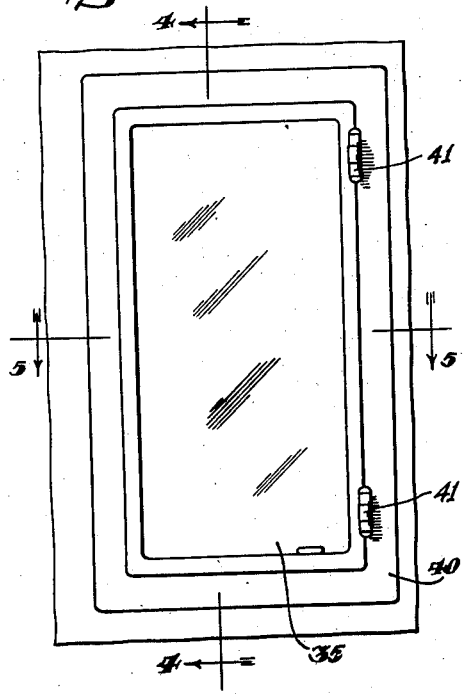
Fig. 3 is an enlarged elevation corresponding to Fig. 1 of an auxiliary door constituting an important feature of one form of my invention.

The conventional motor vehicle, such as the family car or light business delivery truck, is usually provided with an operator's or driver's compartment 10, as shown in Fig. 2, substantially enclosed by the cowl and windshield 11, a pair of doors 12 and the back of a seat 13 which extends from one side of the car to the other. The driver in normal operating position occupies a position such that his eyes are normally at the point indicated at 15 in Fig. 2.

The righthand door 12 is customarily quite wide, so wide that when the car is normally and properly parked and the door is opened, the door hangs over the curb or strikes the curb if it is a high one. The door conventionally comprises an opaque lower section, usually made of steel and covered inside with fiber or textile fabric, and one or more upper glass panels 16 and 17. The front upper panel 16 is usually opened by turning on a vertical axis by an operating handle 18 while the rear upper panel 17 may be lowered into a well in the rear portion 20 (behind the dotted line 20a) of the lower opaque portion of the door by an operating handle 21.

As so far described the car is conventional, and its particular form or arrangement may vary considerably.

Such a car is extremely difficult to park at a convenient and safe distance from the curb of a city street, particularly if the parking space is closely limited by other parked cars. This is due to the impossibility of seeing the curb and the necessity of having to guess where it is. This condition, particularly when the car must be backed in, causes frequent striking of the curb, which damages fenders and tires and makes departure difficult if the car is parked too close and other cars subsequently closely block the car in question in front and in back.

Many indicators, alarms and sighting devices have been proposed to indicate to the operator when the car is at a convenient and safe distance from the curb, but all these which have come to my attention are inconvenient, unreliable or defective in some important particular. My invention involves a construction of the car which eliminates all disadvantages of previously proposed parking aids and which gives a direct, unobstructed view of the curb at all times (even at night) whenever the car is in normal safe parked position with reference to the curb.

In the forward part (in front of the line 20a) of the lower opaque portion of the door, I provide an opening 30 outside the area occupied by the panel 17 when it is lowered into the door. This opening is in front of and below the level of the seat, being in front of the legs of a passenger occupying the right side of the seat. The opening is so placed that when the car is properly parked with reference to the curb (preferably about four to six inches from the curb), there is an unobstructed line of sight 32 from the normal eye point 15 of the operator to the curb opposite the door. The usual city curb is high enough, at least five or six inches, to damage seriously tires which are rubbed against the curb in parking. And many curbs are sufficiently high to damage the fenders even though the tires clear the curb. Thus the driver is in constant danger of damaging his car if he parks it close enough to the curb to assure clearing the street. The opening 30 is long enough or high enough to enable the driver to see the corners of curbs of varying height, particularly those which are as low as the thickness of the tire (five or six inches) when the car is quite close to the curb (two to six inches). Thus when the car is being placed beside the curb, either in driving forward or backing, the driver can tell at a glance where the car is with reference to the curb and easily place the car at the right distance to avoid danger of damage to the car or difficulty in getting out, at the same time getting the car close enough to clear the street.

In order to reveal the curb clearly at night a lamp 33 may be mounted on the right side of the car, illuminating the running board, if any, and the curb. This may be controlled in any suitable manner, manually or automatically.

Preferably the opening is suitably closed by a door 35 hinged on a vertical axis and opening outwardly from the front by any suitable manual control device 36. The door 35 may be opened to the position shown in Fig. 5 by the bell crank lever 36, pivoted at 36a and having an operating end 36b slidable in a guide 36c attached to the door 35. The door when open serves as a convenient ventilator and assures an unobstructed view of the curb. If desired, for use in cold weather the door may be provided with a transparent panel 38 which affords a clear view of the curb without opening the door.

Figure 4:
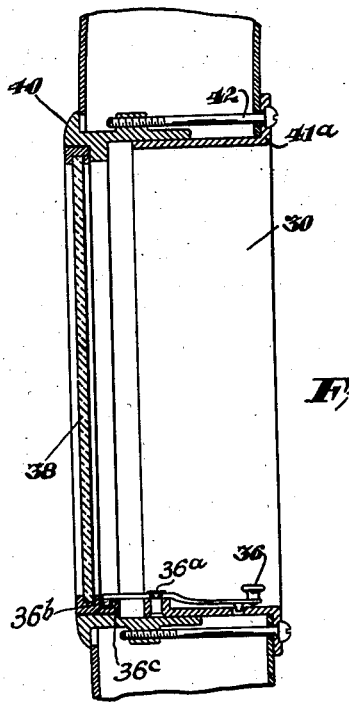
Fig. 4 is a section on the line 4—4 of Fig. 3.
Figure 5:
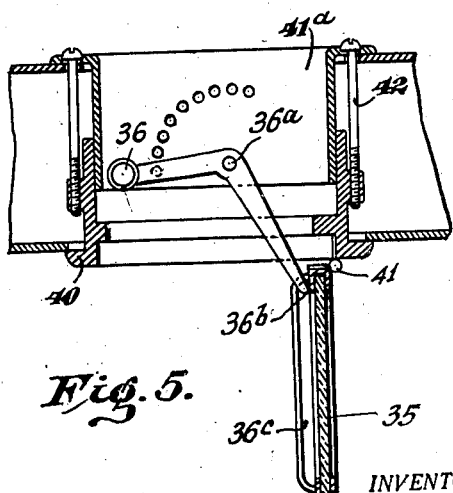
Fig. 5 is a section on the line 5—5 of Fig. 3.

The door 35 may be mounted on the door 12 in any suitable manner. In Figs. 4 and 5 I have indicated one form of construction including a bushing or bezel 40 to which the hinges 41 of the door 35 are secured. This fits inside the opening in the door 12 and is held in place by a telescoping bushing 41a and screws 42.

While I have shown and described in this application one embodiment which my invention may assume in practice, it will be understood that this embodiment is merely for the purpose of illustration and description and that various other forms may be devised within the scope of my invention as disclosed in the appended claims.

What I claim as my invention is:

1. In a motor vehicle, the combination with a substantially enclosed operator's compartment including a seat extending from one side of the vehicle to the other, of a door affording access to the compartment, said door being adapted to open outwardly and being of a width to project, when the door is open, beyond the sides of the vehicle and to overhang a street curb when the door is open and the vehicle is properly parked beside such curb, the door also having an opaque lower portion and an upper panel slidable into said lower portion, said opaque portion extending from the bottom of the door to a substantial distance above a straight line extending from the eye of the operator to said curb at a point beside said door when the vehicle is normally parked beside said curb, said door having an opening through said opaque lower portion, said opening being disposed outside the edges of said panel when said panel is slid fully into said lower portion and said opening being in position to afford, when the door is closed and the vehicle is normally parked by said curb, an unobstructed line of sight from the eye of the operator in normal driving position to said curb at a point beside said door, and a manually operable door for closing said opening.

2. In a motor vehicle, the combination with a substantially enclosed operator's compartment including a seat extending from one side of the vehicle to the other, of a door affording access to the compartment, said door being adapted to open outwardly and being of a width to project, when the door is open, beyond the sides of the vehicle and to overhang a street curb when the door is open and the vehicle is properly parked beside such curb, the door also having an opaque lower portion and an upper panel slidable into said lower portion, said opaque portion extending from the bottom of the door to a substantial distance above a straight line extending from the eye of the operator to said curb at a point beside said door when the vehicle is normally parked beside said curb, said door having an opening through said opaque lower portion, said opening being disposed outside the edges of said panel when the panel is slid fully into said lower portion and said opening being in position to afford, when the door is closed and the vehicle is normally parked by said curb, an unobstructed line of sight from the eye of the operator in normally driving position to said curb at a point beside said door, and a manually operable door for closing said opening, said manually operable door being hinged on a vertical axis and adapted to open outwardly.

3. In a motor vehicle, the combination of a substantially enclosed operator's compartment including a seat extending from one side of the vehicle to the other, of a door affording access to the compartment, said door being adapted to open outwardly and being of a width to project, when the door is open, beyond the sides of the vehicle and to overhang a street curb when the door is open and the vehicle is properly parked beside such curb, the door also having an opaque lower portion and an upper panel slidable into said lower portion, said opaque portion extending from the bottom of the door to a substantial distance above a straight line extending from the eye of the operator to said curb at a point beside said door when the vehicle is normally parked beside said curb, said door having an opening through said opaque lower portion, said opening being disposed outside the edges of said panel when said panel is slid fully into said lower portion and said opening being in position to afford, when the door is closed and the vehicle is normally parked by said curb, an unobstructed line of sight from the eye of the operator in normal driving position to said curb at a point beside said door, and a transparent, manually operable door for closing said opening.

4. In a motor vehicle, the combination with a substantially enclosed operator's compartment including a seat extending from one side of the vehicle to the other, of a door affording access to the compartment, said door being adapted to open outwardly and being of a width to project, when the door is open, beyond the sides of the vehicle and to overhang a street curb when the door is open and the vehicle is properly parked beside such curb, the door also having an opaque lower portion and an upper panel slidable into said lower portion, said opaque portion extending from the bottom of the door to a substantial distance above a straight line extending from the eye of the operator to said curb at a point beside said door when the vehicle is normally parked beside said curb, said door having an opening through said opaque lower portion, said opening being disposed outside the edges of said panel when the panel is slid fully into said lower portion and said opening being in position to afford, when the door is closed and the vehicle is normally parked by said curb, an unobstructed line of sight from the eye of the operator in normal driving position to said curb at a point beside said door.

5. In a motor vehicle, the combination with a substantially enclosed operator's compartment including a seat extending from one side of the vehicle to the other, of a door affording access to the compartment, said door being adapted to open outwardly and being of a width to project, when the door is open, beyond the sides of the vehicle and to overhang a street curb when the door is open and the vehicle is properly parked beside such curb, the door also having an opaque lower portion and an upper panel slidable into said lower portion, said opaque portion extending from the bottom of the door to a substantial distance above a straight line extending from the eye of the operator to said curb at a point beside said door when the vehicle is normally parked beside said curb, said door having an opening through said opaque lower portion, said opening being disposed in front of and below the level of said seat and in position to afford, when the door is closed and the vehicle is normally parked by said curb, an unobstructed line of sight from the eye of the operator in normal driving position to said curb at a point beside said door.

WILLIAM M. THOMPSON.